(12) United States Patent
Tomich et al.

(10) Patent No.: US 8,884,805 B2
(45) Date of Patent: Nov. 11, 2014

(54) SYSTEMS AND METHODS FOR MAPPING THE CRUST OF THE EARTH

(75) Inventors: John L. Tomich, Coppell, TX (US); Raymond Samaniego, Prosper, TX (US); Enrique A. Santiago, Allen, TX (US); Leslie A. Priebe, Plano, TX (US)

(73) Assignee: Raytheon Company, Waltham, MA (US)

( * ) Notice: Subject to any disclaimer, the term of this patent is extended or adjusted under 35 U.S.C. 154(b) by 660 days.

(21) Appl. No.: 13/089,720

(22) Filed: Apr. 19, 2011

(65) Prior Publication Data

US 2012/0268307 A1 Oct. 25, 2012

(51) Int. Cl.
- G01S 13/00 (2006.01)
- G01S 13/88 (2006.01)
- G01S 13/89 (2006.01)
- H01Q 21/06 (2006.01)

(52) U.S. Cl.
CPC .............. G01S 13/89 (2013.01); G01S 13/885 (2013.01); H01Q 21/062 (2013.01)
USPC ......................................................... 342/22

(58) Field of Classification Search
USPC ......................................................... 342/22
See application file for complete search history.

(56) References Cited

U.S. PATENT DOCUMENTS

| | | | | |
|---|---|---|---|---|
| 3,775,765 A | * | 11/1973 | Di Piazza et al. | 342/22 |
| 4,843,597 A | * | 6/1989 | Gjessing et al. | 367/15 |
| 5,835,054 A | * | 11/1998 | Warhus et al. | 342/22 |
| 7,154,434 B1 | * | 12/2006 | Sego | 342/161 |
| 8,289,201 B2 | * | 10/2012 | Holly et al. | 342/22 |
| 2002/0050942 A1 | * | 5/2002 | Grisham | 342/25 |
| 2002/0122000 A1 | * | 9/2002 | Bradley et al. | 342/22 |
| 2004/0118313 A1 | | 6/2004 | Temes et al. | |
| 2007/0007966 A1 | | 1/2007 | Meyer | |
| 2009/0167589 A1 | * | 7/2009 | Bausov | 342/22 |
| 2010/0052971 A1 | * | 3/2010 | Amarillas | 342/22 |
| 2010/0315280 A1 | * | 12/2010 | Bakhtar | 342/22 |
| 2011/0227577 A1 | * | 9/2011 | Zhang et al. | 324/338 |

OTHER PUBLICATIONS

Cardimona, Steve, Subsurface Investigation Using Ground Penetrating Radar, Department of Geology and Geophysics, University of Missouri-Rolla, Rolla, MO, 15 pages.

Mercury Spotlight, Application Note, Black River Systems, Revealing Deep Dark Secrets, Mercury Computer Systems, Inc. 2 pages.

* cited by examiner

*Primary Examiner* — Timothy A Brainard
(74) *Attorney, Agent, or Firm* — Daly, Crowley, Mofford & Durkee, LLP

(57) ABSTRACT

A system comprises a radar transmitter configured to generate a radar signal at a predetermined frequency and a radar receiver configured to receive a reflected signal produced by a reflection of the radar signal. The system further includes a radar antenna system configured to transmit the radar signal into a subterranean region and to receive the reflected signal from the subterranean region. A control system is used for controlling a dwell time of the radar antenna system, and a processor is adapted to generate an image of at least a portion of the subterranean region based at least in part on the reflected signal.

29 Claims, 11 Drawing Sheets

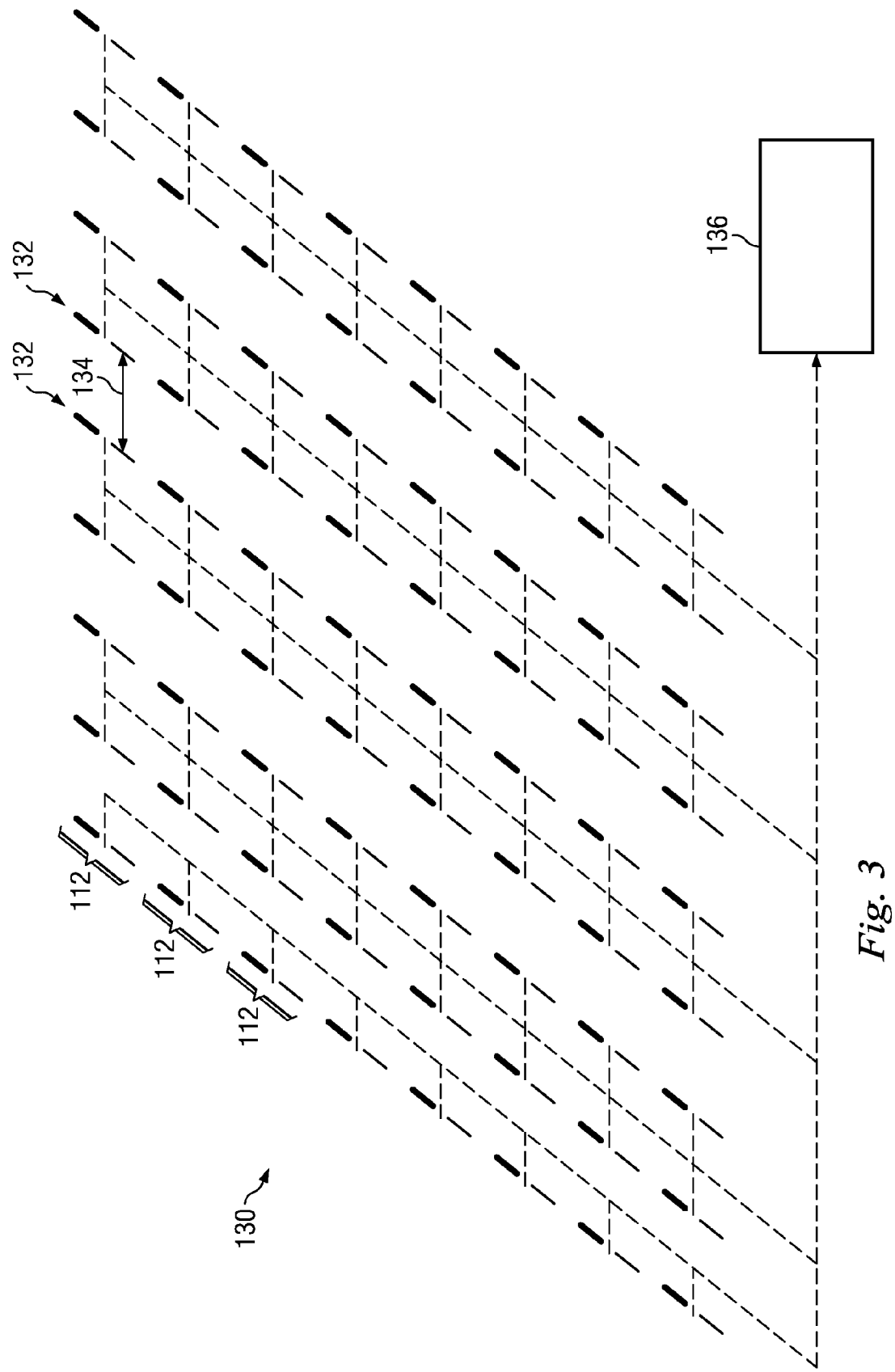

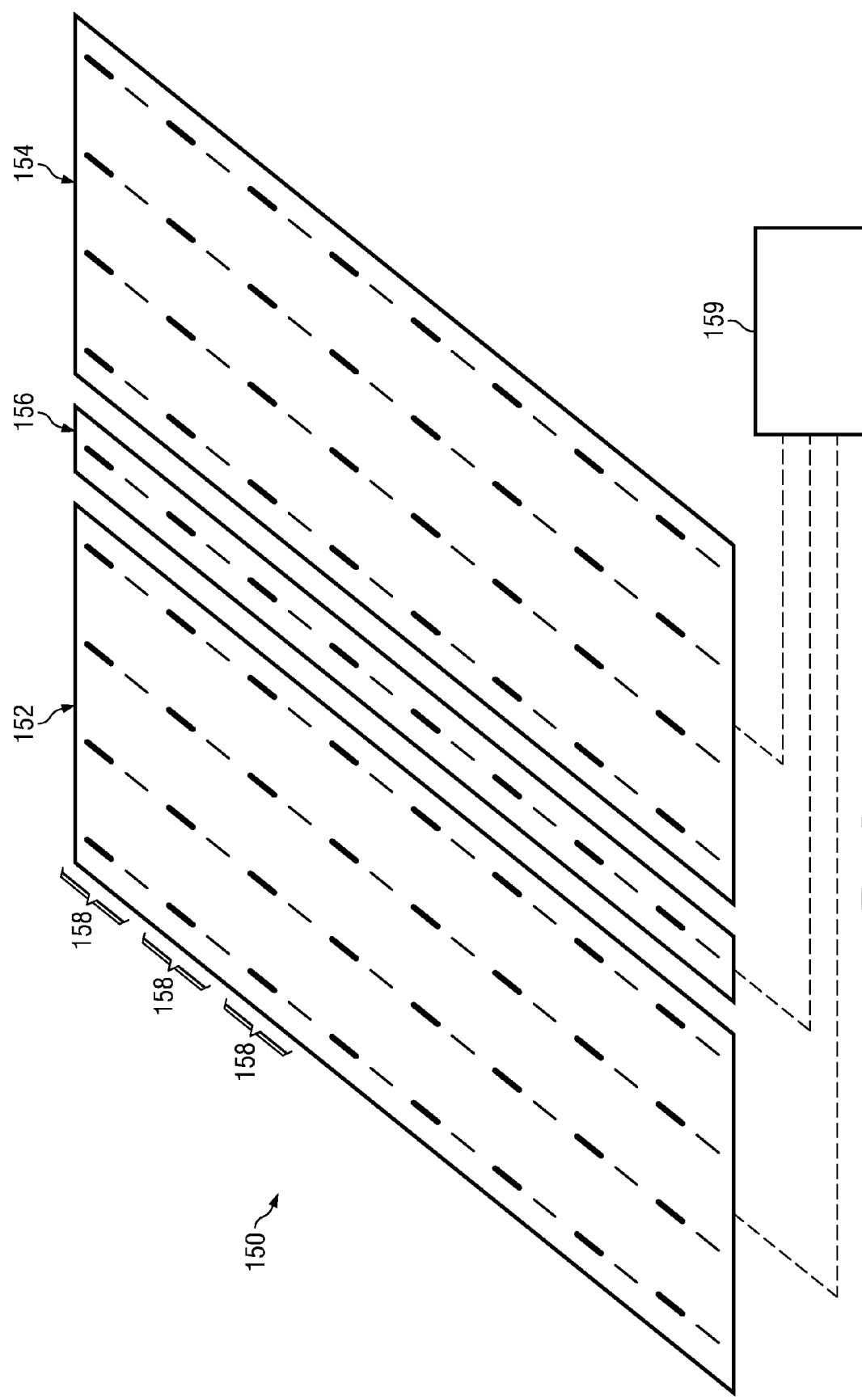

SYSTEMS AND METHODS FOR MAPPING THE CRUST OF THE EARTH

BACKGROUND

Current geoscience technology is able to provide some information about relatively large subterranean areas such as those that constitute potentially large oil and gas bearing formations. However, relatively little is known about the more detailed fissures, fractures, and faults in the Earth's crust that may support a subterranean biosphere by enabling hydrocarbons, such as methane gas, to move from areas deep within the Earth toward the outer layers of the Earth's crust. Current seismic technology can detect and provide information about relatively large geological formations such as oil and gas deposits, but is unable to provide high resolution imaging that would be needed for more detailed mapping of the Earth's crust. Improved systems and methods are needed for imaging and analyzing the detailed structures of the Earth's crust.

BRIEF DESCRIPTION OF THE DRAWINGS

A better understanding of the present invention will be realized from the detailed description that follows, taken in conjunction with the accompanying drawings, in which:

FIG. 3 is an illustration of one embodiment of an interferometric radar array system.

FIG. 5 is an illustration of another embodiment of an interferometric radar array system.

DETAILED DESCRIPTION

The following disclosure provides many different embodiments, or examples, for implementing different features of the invention. Specific examples of components and arrangements are described below to simplify the present disclosure. These are, of course, merely examples and are not intended to be limiting.

Figure 1:
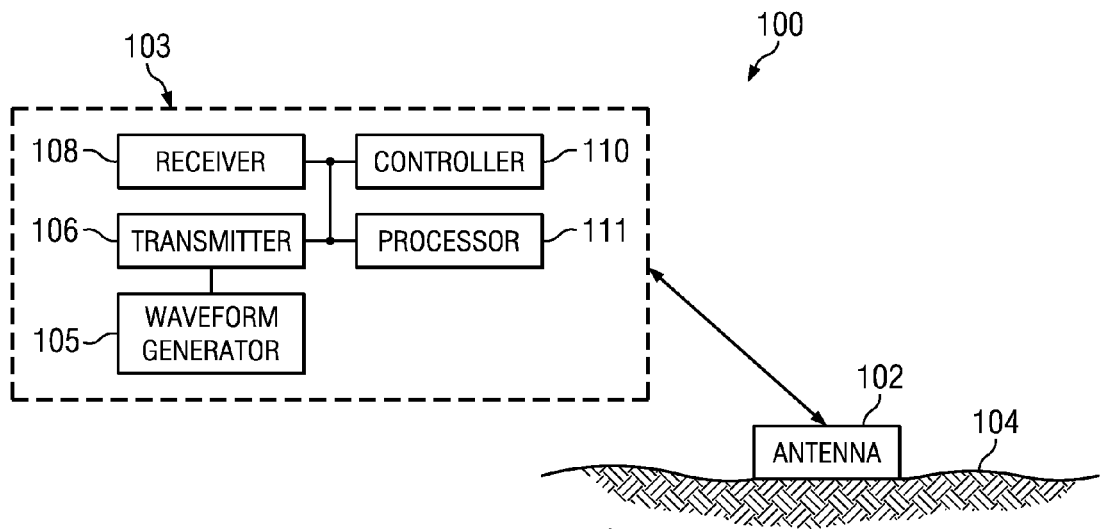
FIG. 1 is a schematic illustration of a radar system for mapping subterranean regions of the Earth's crust.

FIG. 1 is a schematic illustration of a radar system 100 for mapping subterranean regions of the Earth's crust by transmitting energy in the form of radio frequency (RF) waveforms into the ground and receiving reflected waveforms for use in determining information about stationary and nonstationary subterranean formations. Information gathered about these formations through the use of the radar system 100 may be used for many purposes including improving the stability of manmade structures such as coal mines; planning for methane hydrate formation mining; inspecting the safety of bridge structures; defining utility pathways; identifying safety issues associated with fissures, fractures, and methane migration paths; tracking subterranean fluid flows; anchoring foundations of nuclear power plants and tall buildings; and identifying the locations where gas, oil, water, and mineral deposits are likely to form. Commercial transaction may be based upon information gathered about the subterranean formations. For example, property sales for minerals, oil, and gas may be categorized by location, depth, mineral type, and mapped concentrations.

The radar system 100 includes an antenna 102 positioned in contact with the ground 104. The antenna 102 may, alternatively, be fully or partially buried or recessed in the ground. The antenna 102 is connected to various radar components 103 that may be located with the antenna at or near the ground 104. Alternatively, one or more of the radar components 103 may be located remotely from the antenna 102. The radar components 103 include a waveform generator 105 that produces an intermediate frequency (IF) signal which is fed to a transmitter 106. The transmitter 106 produces an RF signal which is fed to the antenna 102 and transmitted into the ground 104.

The radar system may be a pulse radar system, in which the radar signal generated by the transmitter comprises short pulses of radio frequency (RF) energy transmitted in sequence. With pulse radar, the return signals are reflected echoes of the pulses and are useful for determining range to the target. Alternatively, the radar system may be a continuous wave (CW) radar system. In a CW radar system, a continuous waveform RF signal is transmitted and a continuous echo signal waveform series is received. Suitable CW signals may include stepped incremental frequency or frequency modulated continuous wave (FMCW) waveforms. CW radar may be particularly useful for continuous transmissions over long durations. Long duration transmission allows for the use of advanced processing techniques to average returns, remove noise, and improve signal to noise ratios. CW radar systems can be used to determine the range of the target and can also be used to detect movement of subterranean formations using Doppler measurement techniques.

The radar components 103 also include a receiver 108 that receives, via the antenna 102, a returned signal that results from the reflection or echo of the radar signal on subterranean formations within the subterranean region. The subterranean region may include relatively stationary subterranean formations such as fractures, fissures, and faults in the Earth's crust; mineral deposits; and oil and gas deposits. The subterranean region may also include nonstationary formations such as flowing fluids, including migrating methane gas.

The transmitter 106, receiver 108, and antenna 102 may be further connected to a controller 110 comprising hardware and software for controlling the operation of the transmitter, receiver, and antenna. A processor 111 and other computer hardware are used to process and analyze signals returned through the antenna 102. Other components such as duplexers, oscillators, mixers, amplifiers, synchronizers, modulators, antenna positioning systems, and power supply systems may be used with the radar system 100 as needed.

Figure 2:
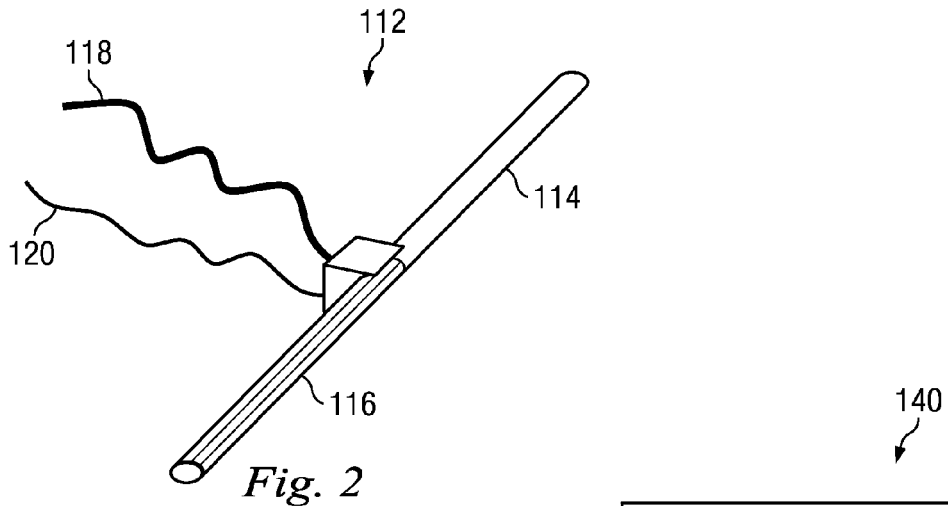
FIG. 2 is an illustration of one embodiment of a radar system.

FIG. 2 is an example of a radar antenna system 112 that may be used as the radar system 100. Radar system 112 includes an antenna, a transmitter, a controller, and a receiver. Signal processing or pre-processing equipment may also be included. The radar system 112 includes a dipole radar antenna with two conductors 114, 116 in collinear arrangement. The radar system 112 can be remotely controlled to selectively transmit radar signals or receive echo radar signals. The radar system 112 further includes a coherent local oscillator feed line 118 and a wide bandwidth data and communication link 120. The feed line 118 may be, for example, a coaxial cable for transmitting a local oscillator master signal from a master local oscillator. The communication and data link 120 may be used to send control commands from a remote radar controller to the radar system 112 and/or to send data from the radar system back to a remote processor. In the depicted embodiment, the communication link 120 may be a physical connection such as a fiber optic cable, but in alternative embodiments, the communication link may be wireless. The communication link may further include a data backhaul system that comprises multiple time shared gigabit fibers to transfer data associated with received signals back to the processor 111. The radar system 112 may include additional components such as a signal processor (not shown) for digitizing signals received from the radar antenna prior to transmission by the communication link 120.

As shown in FIG. 3, a distributed radar array system 130 includes a plurality of remotely controlled radar systems or units 112 that function in a coherent, synchronized manner to provide high resolution images of subterranean formations. In the radar array 130, radar systems 112 are arranged in a grid of spaced apart columns and rows 132. The spacing 134 between the rows 132 may be a function of the selected transmission wavelength. The radar systems 112 of the radar array may be spaced over an acre or more of land, although smaller arrays may also be suitable. The radar array 130 may be buried in the ground or located on the surface of the ground. Although the array may be stationary for days, weeks, or months to achieve the desired dwell times, it may be moved to different locations to map different subterranean regions. To achieve this movement, the system 130 may include wheels, rails, or other structures to facilitate movement.

Preferably, the radar systems 112 of the radar array 130 are positioned relative to the ground so that 90% or more of the generated energy is directed into the ground. Within the radar array 130, the individual radar systems 112 may be selectively capable of both transmit and receive functions. As will be described below, selected radar systems 112 in the radar array 130 may be selected for use as transmit antennas and other radar systems 112 in the radar array 130 may be selected as receive antennas. The radar systems 112 in the radar array 130 are fed by a common local oscillator (LO) signal that is distributed to all of the radar systems 112 to provide coherent transmit and receive operation of the radar array 130. The radar systems 112 in the radar array 130 may also receive a synchronization clock signal to allow synchronized and coherent operation of the radar array.

The radar array system 130 further includes a control center 136, connected to and in communication with the individual radar systems 112, that may house components such as the controllers, processors, and other radar components previously described. These components may be physically co-located or geographically distributed. The controllers in the control center 136 can control the operation of the individual radar systems 112 in the radar array 130. The controllers and processors of the control center 136 can be configured to take quick-look images of the processed data and to adjust the transmitting segments of the radar array 130 and the receiving segments of the radar array to optimize the resultant data and images. Although the radar antenna of this embodiment has been described as using collinear dipole elements, it is understood that folded dipoles, parabolic antennas or other antenna systems may be suitable.

Figure 4:
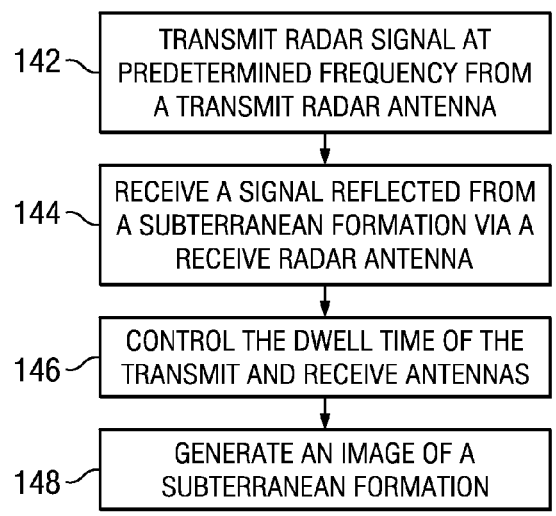
FIG. 4 is a flow chart depicting a method of using the interferometric radar array system of FIG. 3.

As shown in FIG. 4, a method 140 of using the interferometric radar array system 130 includes the step 142 of transmitting a radar signal from one or more of the radar systems 112 into a subterranean region at a predetermined frequency or at predetermined stepped frequency increments through a transmit bandwidth sufficient for obtaining a suitable resolution at the maximum target range. The subterranean region may include relatively stationary and nonstationary subterranean formations. The subterranean region is located underground within approximately the upper 10 km of the Earth's crust, but performance may extend to 50 km or more. Subterranean formations in the upper 10 km of the Earth's crust may be of particular interest since faults, earthquakes, and fluid migrations at these levels may be more likely to impact structures and life on the surface of the Earth. The predetermined frequency used for the radar signal will be selected from a relatively low range, for example 10 KHz to 300 MHz. A range between 10 KHz to 100 MHz may be particularly suitable. The transmitted radar signal encounters the subterranean features and is reflected back toward the surface of the Earth as a reflected or return signal.

At step 144, the remaining radar systems 112 in the radar array 130 are set to function as an interferometric receive array to receive the reflected signal. At step 146, the dwell time that the transmit and receive antennas are fixed to "stare" at the selected subterranean region is controlled for an extended period of time. Suitable dwell times may extend more than one hour or may extend over days and weeks. Dwell times up to and exceeding 1000 hours may be suitable for the most detailed imaging. During the long dwell times, transmit and receive steps 142, 144 may be performed many times so that data from each transmit/receive cycle can be coherently combined together. Further, the transmit frequency may be varied or stepped over the course of the dwell time. To accommodate these long dwell times, the transmitters and receivers are designed to meet phase drift tolerances for the time period of the dwells. Further, very stable clocks, oscillators, and other components are used to provide a very stable transmission source able to provide coherent RF transmission over the period of the long dwells.

In one embodiment, the same transmit antenna may be used for each transmission, but in an alternative embodiment, a synchronized "transmit hopping" procedure is used. Since each radar system 112 in the radar array 130 is capable of performing transmit and receive functions, different antennas or groups of antennas within the radar array 130 can be selected to be the transmit antenna. The radar controllers of the control center 136 can select a different transmit radar system 112 or group of radar systems 112 to be used for each transmission or may allow a transmit radar system to transmit for a given time period before switching to a different transmit radar system. The remaining radar systems 112 in the radar array 130 continue to serve as receive antennas. The radar controllers may employ a pattern for selecting the transmit antenna. For example, each antenna in an array row may be used, in order, before using an antenna from an adjacent array row. Transmit hopping across the radar array can be used to improve depth perception and to create more detailed three dimensional images. The use of different transmit radar systems effect slightly different look angles which improve the imaging of the subterranean formations.

At step 148 the signals gathered from the receive antennas over the course of the long dwell are processed and analyzed to produce images and maps of the selected subterranean region. The images may depict stationary formations or nonstationary formations. Imaging techniques, such as three-dimensional backprojection, which construct images from multiple sources can be used to generate images of the subterranean formations. For every radar system 112 in the radar array 130, the received signals are backprojected in three dimensions using model based and data driven focusing in an iterative manner until convergence is reached. The combination of the resulting three dimensional images formed from every radar system 112 can be weighted by phase and amplitude statistics formed across the multiple images from the radar array 130. This weighting may serve to suppress sidelobes and noise. Three dimensional backprojection methods may be particularly suitable because processing is relatively time independent. Signals received from each radar system 112 are simply phase aligned and summed into a three dimensional image over time. Further focusing techniques can be applied after initial image formation.

Specific analysis methods that may be used include interferometric processing techniques can be used to analyze the signals collected from the antennas in the array to produce high resolution, three dimensional images. Doppler processing techniques can be used to identify subterranean movement of fluids. Tomographic three-dimensional processing techniques can also be used to integrate multiple views of the subterranean region into a composite image. Over the course of long dwells, the returned "clutter" echoes from the subterranean regions are analyzed to reveal coherent patterns indicating the presence of structures, voids, or fluid flows. A variety of signal processing techniques and other image generation techniques may be used to image the subterranean formations. Some of these techniques and information regarding imaging systems has been described in U.S. Pat. No. 7,898,468 and U.S. application Ser. No. 12/502,325, which are incorporated by reference herein, in their entirety.

The generated images of the subterranean formations may be used to improve the construction and maintenance of manmade structures such as mines, bridges, utility paths, buildings. Additionally the subterranean formation may be used to identify the locations of gas, oil, water, and mineral deposits. Aspects of these deposits such as location, depth, mineral type, and concentrations may be used to assign property valuations to these deposits. Commercial transactions, such as sales or leases, may be structured based upon these aspects of these deposits and the corresponding valuations.

As shown in FIG. 5, a radar array system 150 may be divided into subarrays 152, 154, 156. Each of the subarrays 152, 154, 156, include individual radar antennas 158. In subarray 156, the constituent radar antennas 158 function as transmission elements. As contrasted with the full distributed radar systems 112 of radar array system 130, the individual radar antennas 158 do not include individual transmitters and receivers. Rather, a common transmitter, located for example in a control center 159, generates the transmit waveform and sends that signal through a phase matched RF distribution medium to the individual radiating antennas 158 of the transmit antenna array 156. In subarrays 152 and 154, the receive signals from the constituent radar antennas 158 are consolidated and sent to receivers in control center 159. In one embodiment, a general purpose network analyzer may serve as a transmitter and receiver in the control center 159. In subarray 152, the radar antennas 158 function together in a phase matched receive array. In subarray 154, the constituent radar antennas 102 function together in another phase matched receive array. In use, all of the radar antennas 158 of the transmit subarray 156 are selected to be the transmit antenna for transmitting the radar signal. The receive arrays 152, 154 detect the reflected signals. The signals from both receive arrays are used to generate an image of the subterranean region.

Figure 6:
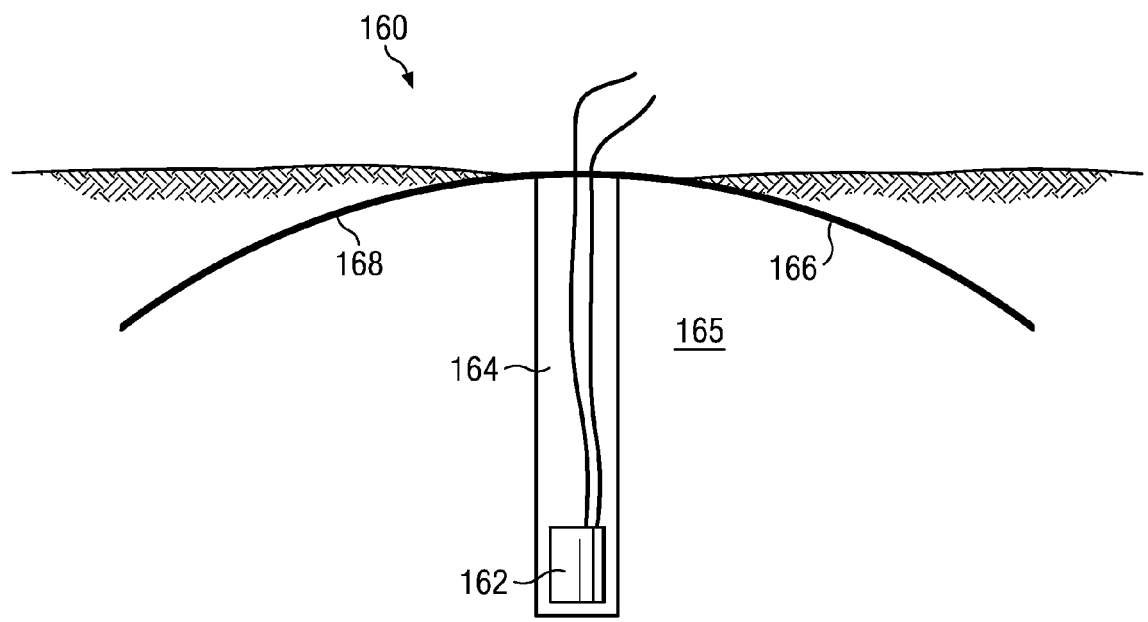
FIG. 6 is an illustration of another embodiment of an antenna for use in a radar system.

Referring now to FIG. 6, a differently configured radar antenna can be used for imaging a subterranean region. In this embodiment, a radar antenna system 160 includes a dipole antenna 162 located in a feed hole 164 bored into the local medium 165. The antenna 162 is mounted to the bottom of the feed hole 164 and the feed hole is back filled. A parabolic surface 166 is graded over the top of the antenna 162 and a reflective surface 168, such as aluminum foil, is applied to the parabolic surface. The area over the reflective surface 168 is back filled to a topographical level.

Figure 7:
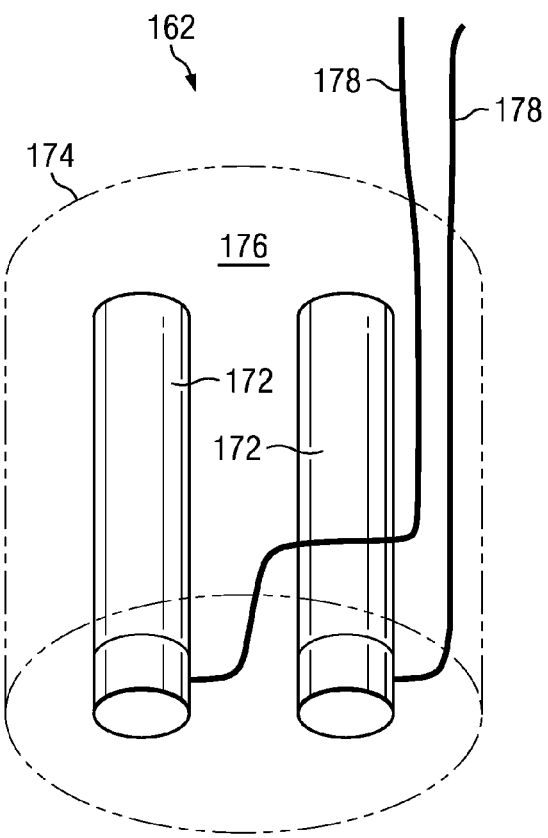
FIG. 7 is an illustration of a portion of the antenna of FIG. 6.

One example of a suitable antenna 162 is shown in FIG. 7. Dielectric rod antennas 172 are housed within a container 174 filled with dielectric matching material 176 that matches the local medium 165. The dielectric rod antennas 172 have a two layer design as described more fully in the article, "Two-Layer Dielectric Rod Antenna", Chung et al., IEEE Transactions on Antennas and Propagation, Vol. 56, No. 6 (June, 2008) which is incorporated by reference herein it its entirety. Although two dielectric rod antennas 172 are shown, it is understood that more can be used within the container 174. The antennas 172 include one or more feed lines 178 for signal transmission. Fibers, wires, or other conduits for communication and control (not shown) may also extend from the antennas 172.

Figure 8:
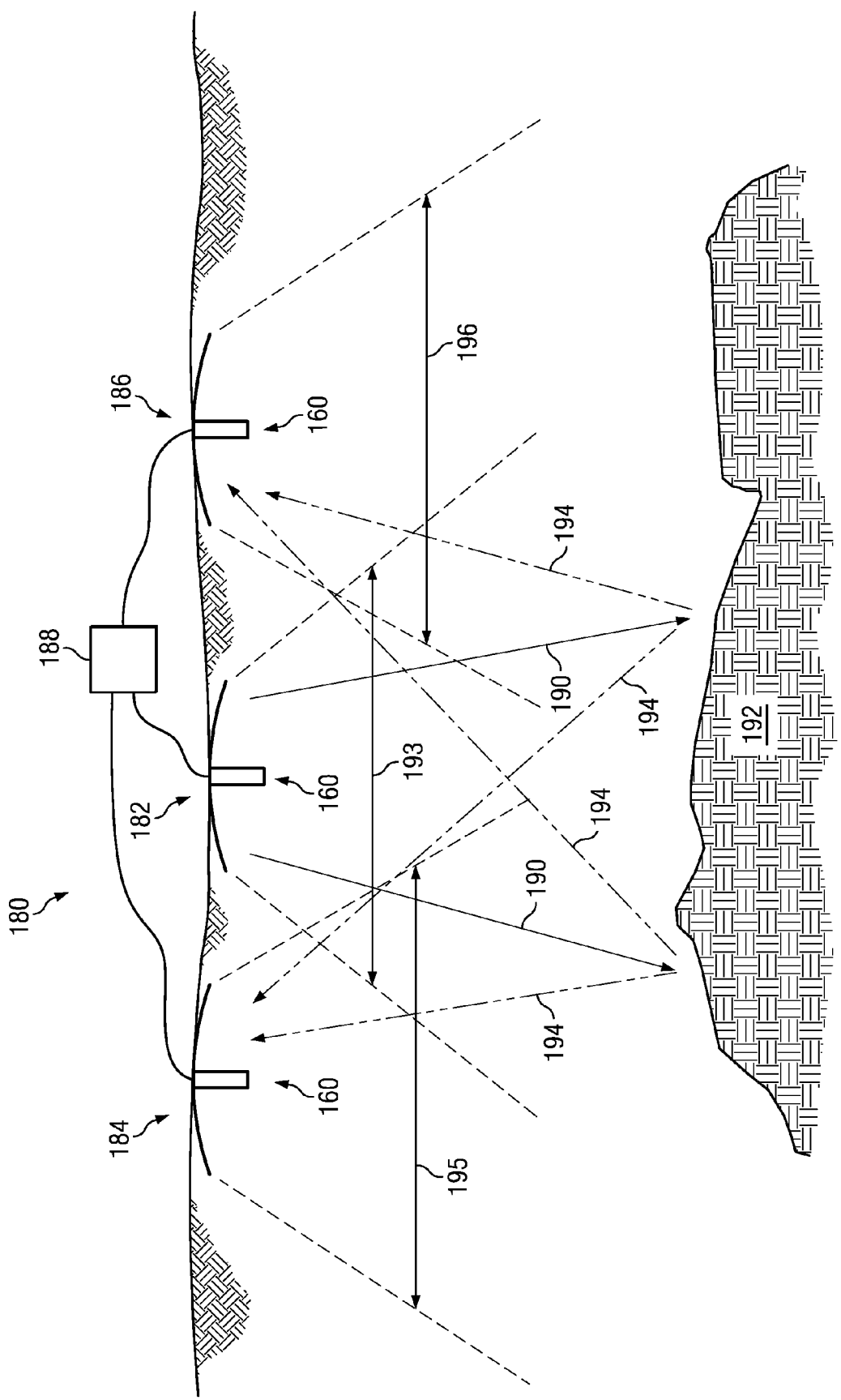
FIG. 8 is an illustration of the antenna of FIG. 6 used in a radar system.
Figure 9:
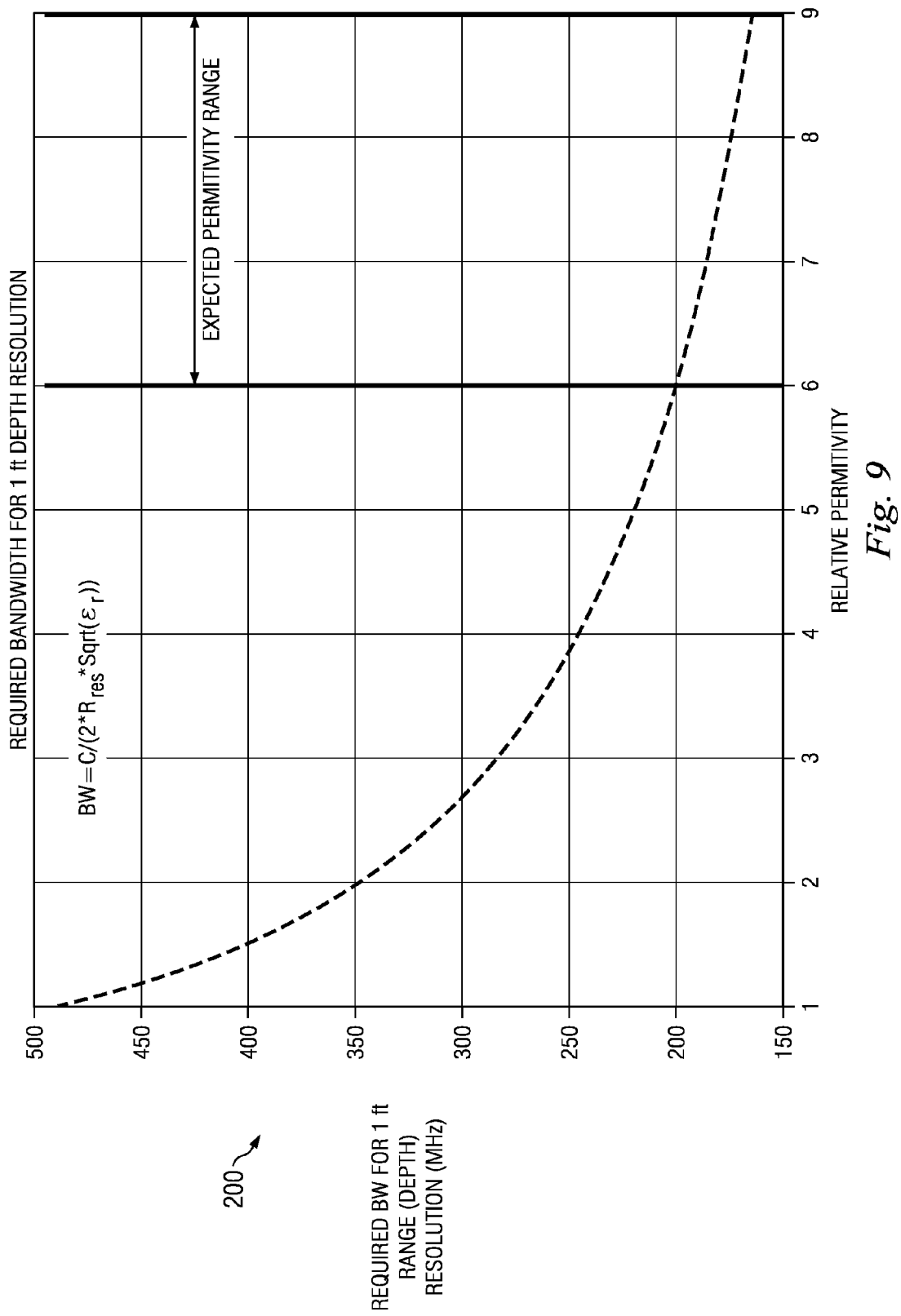
FIGS. 9-14 are graphs providing analysis of the high resolution imaging and mapping capabilities of the disclosed radar systems.

FIG. 8 depicts a transmit/receive radar system 180 using three of the radar antenna systems 160. One of the radar antenna systems 160 is configured as a transmit antenna 182. The other two radar antenna systems 160 are configured as receive antennas 184, 186. A component center 188 may include additional radar components such as those for transmission, reception, system control, signal processing, and data analysis.

The transmit antenna 182 transmits a radar signal 190, which in this embodiment is a continuous wave signal, toward a subterranean region 192, through a transmit aperture 193. Reflected or echo signals 194 are returned toward the surface of the Earth and received by the receive antennas 184, 186 through receive apertures 195, 196 respectively. As with previously described embodiments, antennas 182, 184, 186 are controlled to have long dwell times. For example, the transmit radar signal 190 may be continuously transmitted for dwell times on the order of hours, days, or weeks. Data generated during these long dwells may be processed and analyzed, as described above, to develop high resolution images of the subterranean region 192.

The graphs provided at FIGS. 9-14 support the analysis and assertions that high resolution imaging and mapping can be achieved using the foregoing systems and methods. For example, in FIG. 9, graph 200 shows that depth resolution is a function of material properties of the material being penetrated. As shown, a one foot depth resolution is achievable with a receiver bandwidth of at least 200 MHz, although 300 MHz or other frequencies may also be used. The receiver bandwidth may be determined with the function, $BW = C/(2*R*Sqrt(\in_R))$, where BW is receiver bandwidth, C is the speed of light, R is resolution, and $E_R$ is relative permittivity. Typical ground permittivity is in the range of 6 to 9.

Figure 10:
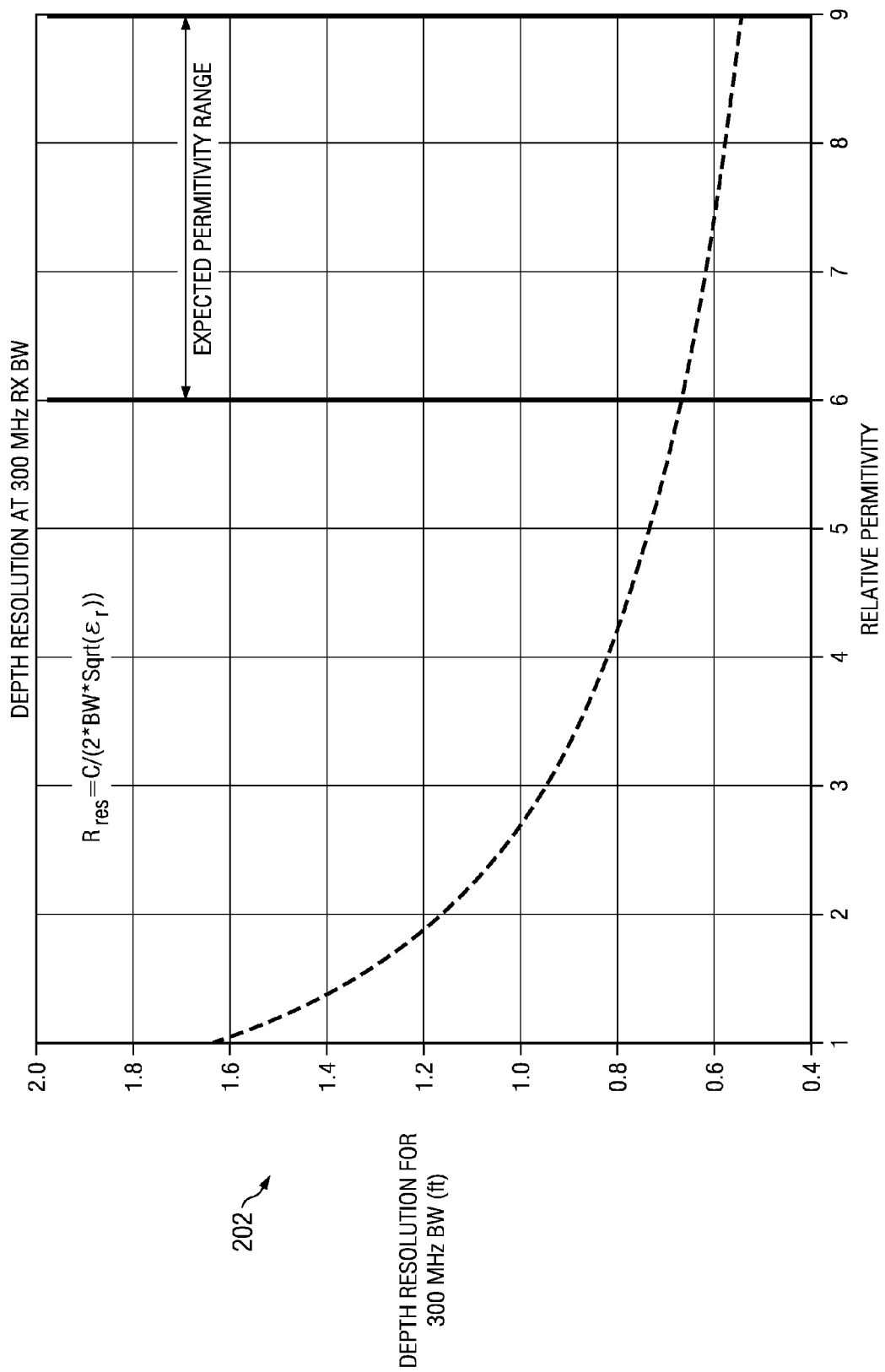

In FIG. 10, graph 202 shows that a 1 ft. resolution can be achieved with a receiver bandwidth of 300 MHz if relative permittivity of the propagation medium is above 2. Since the typical ground permittivity is 6-9, depth resolutions of less than 1 ft. are achievable at a bandwidth of 300 MHz.

Figure 11:
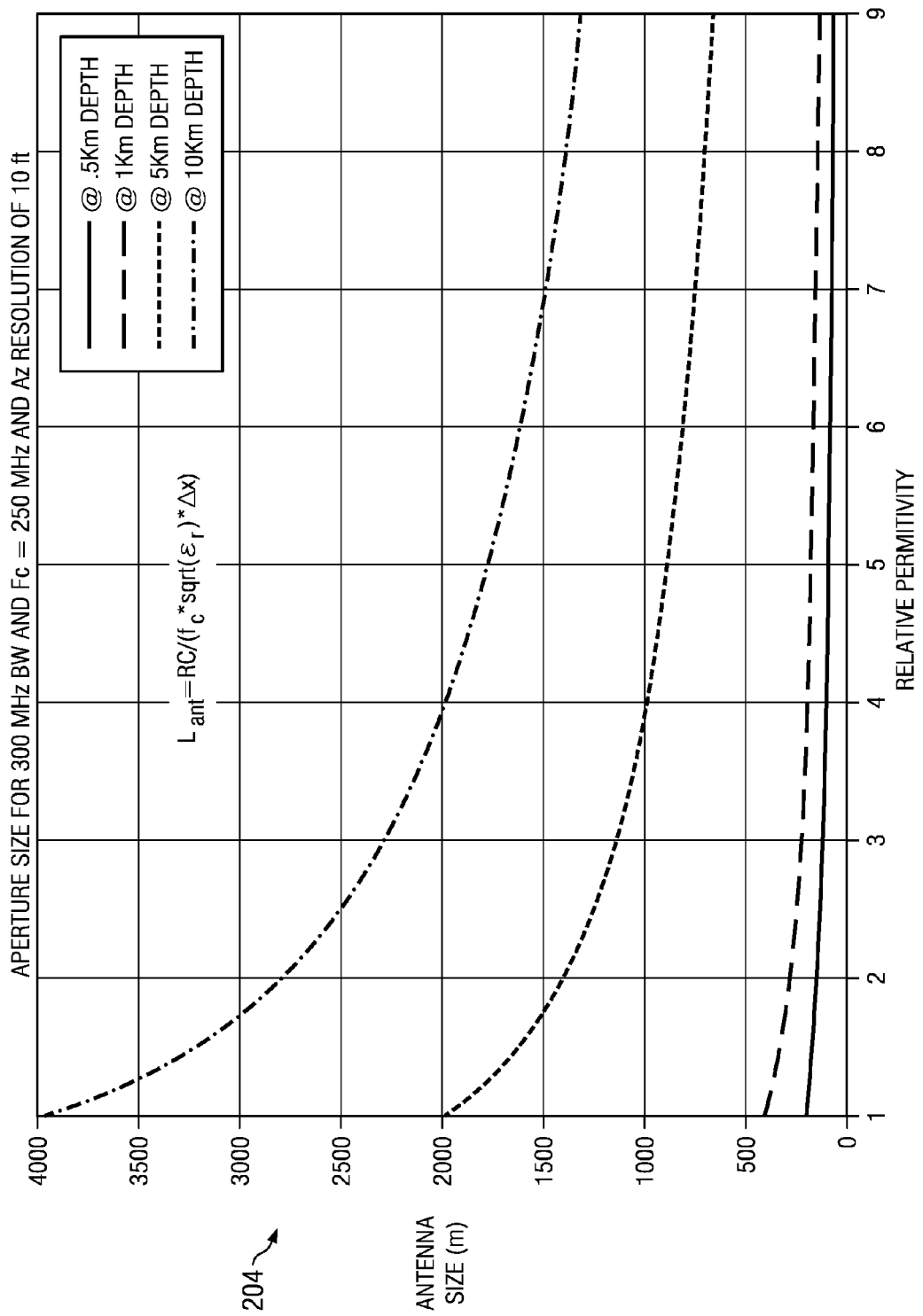
Figure 12:
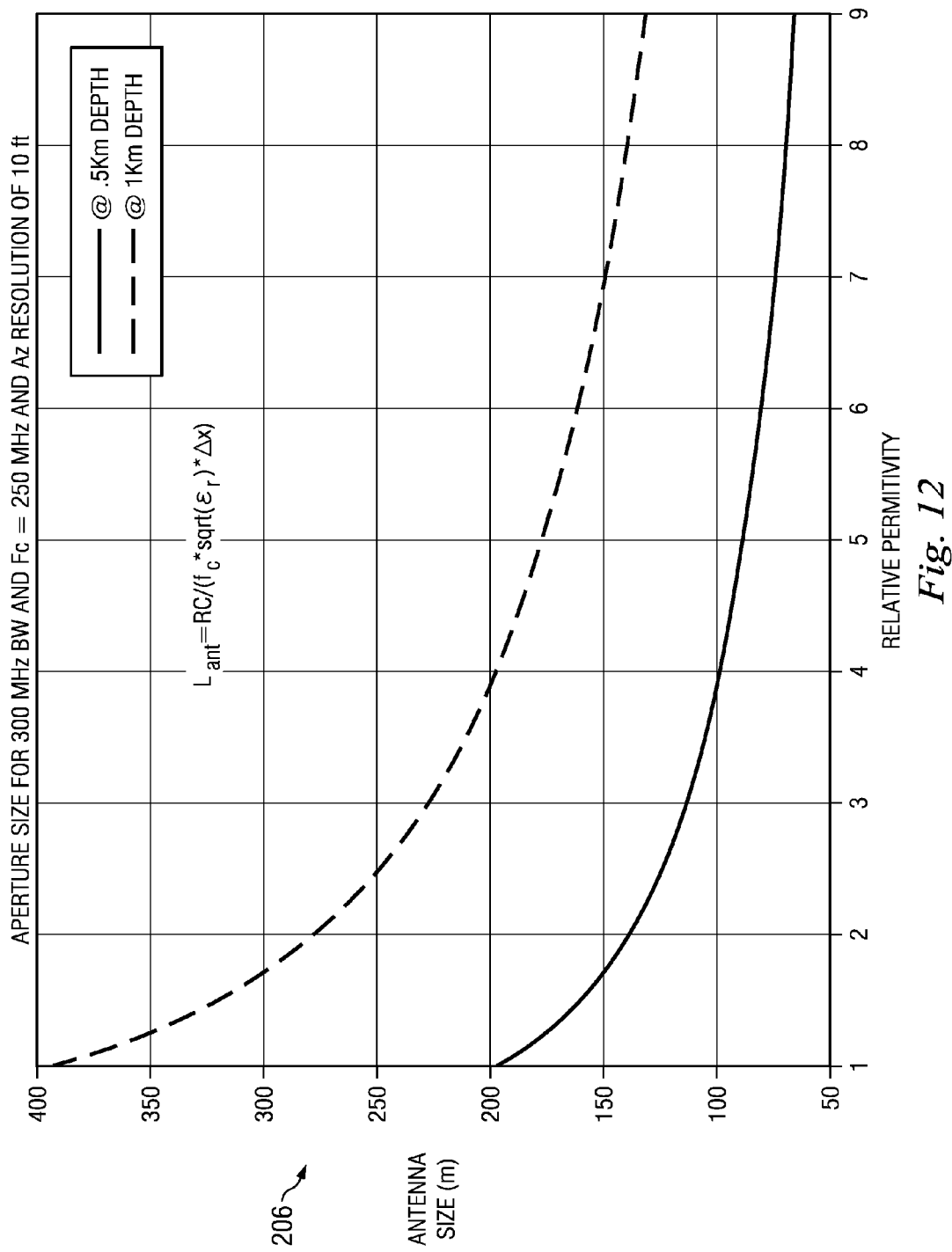

In FIG. 11, graph 204 shows the required aperture size (in either X or Y) to achieve a 10 ft. azimuth (elevation) resolution for a given permittivity, where a receiver bandwidth of 300 MHz and a frequency ($f_c$) of 250 MHz is used. The aperture size needed for four different depths, 500 m, 1 km, 5 km, and 10 km is shown. The size of the aperture ($L_{ant}$) can be determined with the function, $L_{ant} = RC/f_c * Sqrt(\in_R) * \Delta x$, where $f_c$ is the center frequency. For nearly all of the depths, an aperture size greater than 100 m would be suitable to achieve the desired resolution. The depicted analysis is for a single antenna. The full aperture transmit and receive subarrays can be programmed remotely. Using interferometric array methodologies, the resolution can be further enhanced. In FIG. 12, graph 206 shows the same 500 m and 1 km depth curves as in FIG. 11, but with a more detailed scale for the aperture size.

Figure 13:
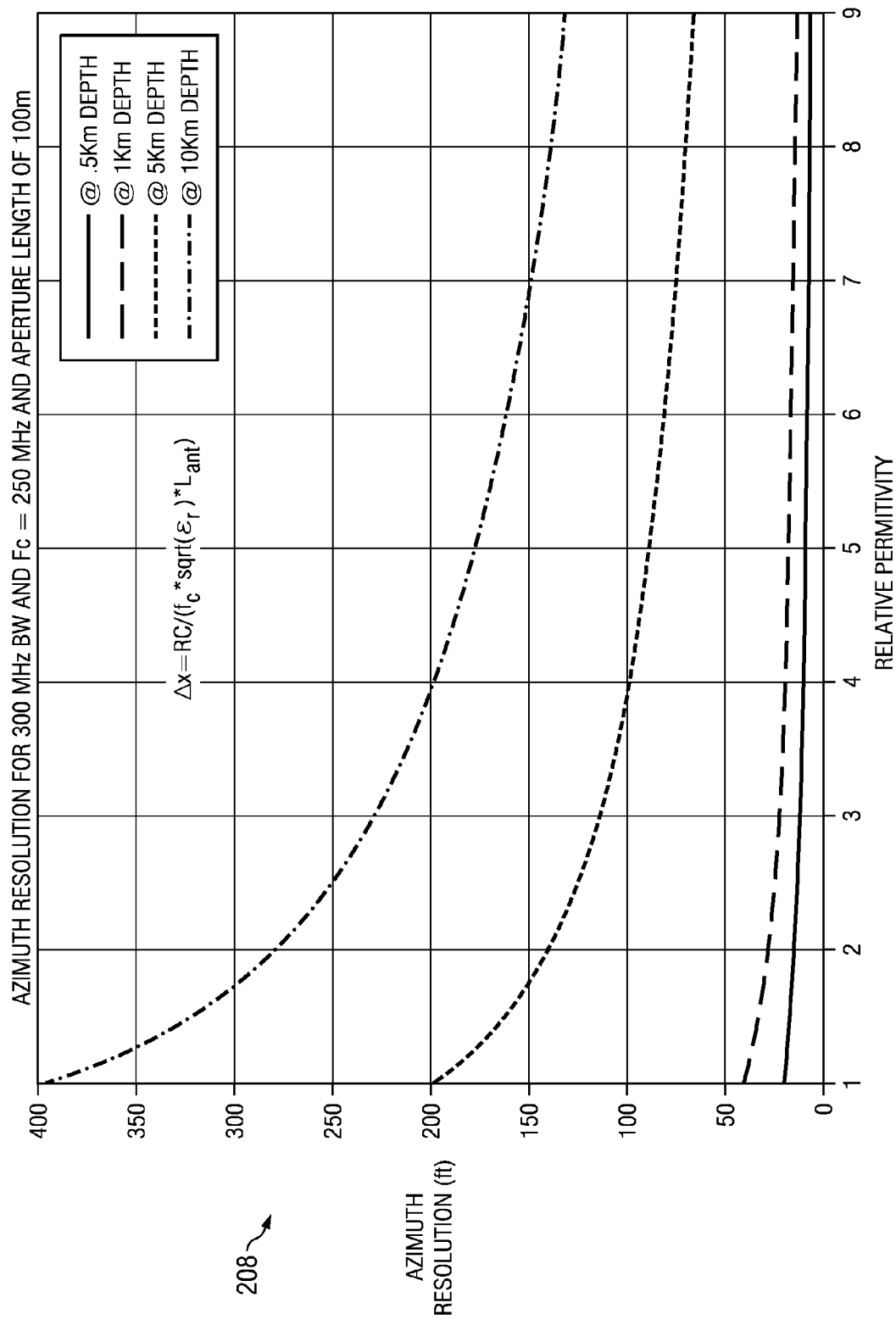
Figure 14:
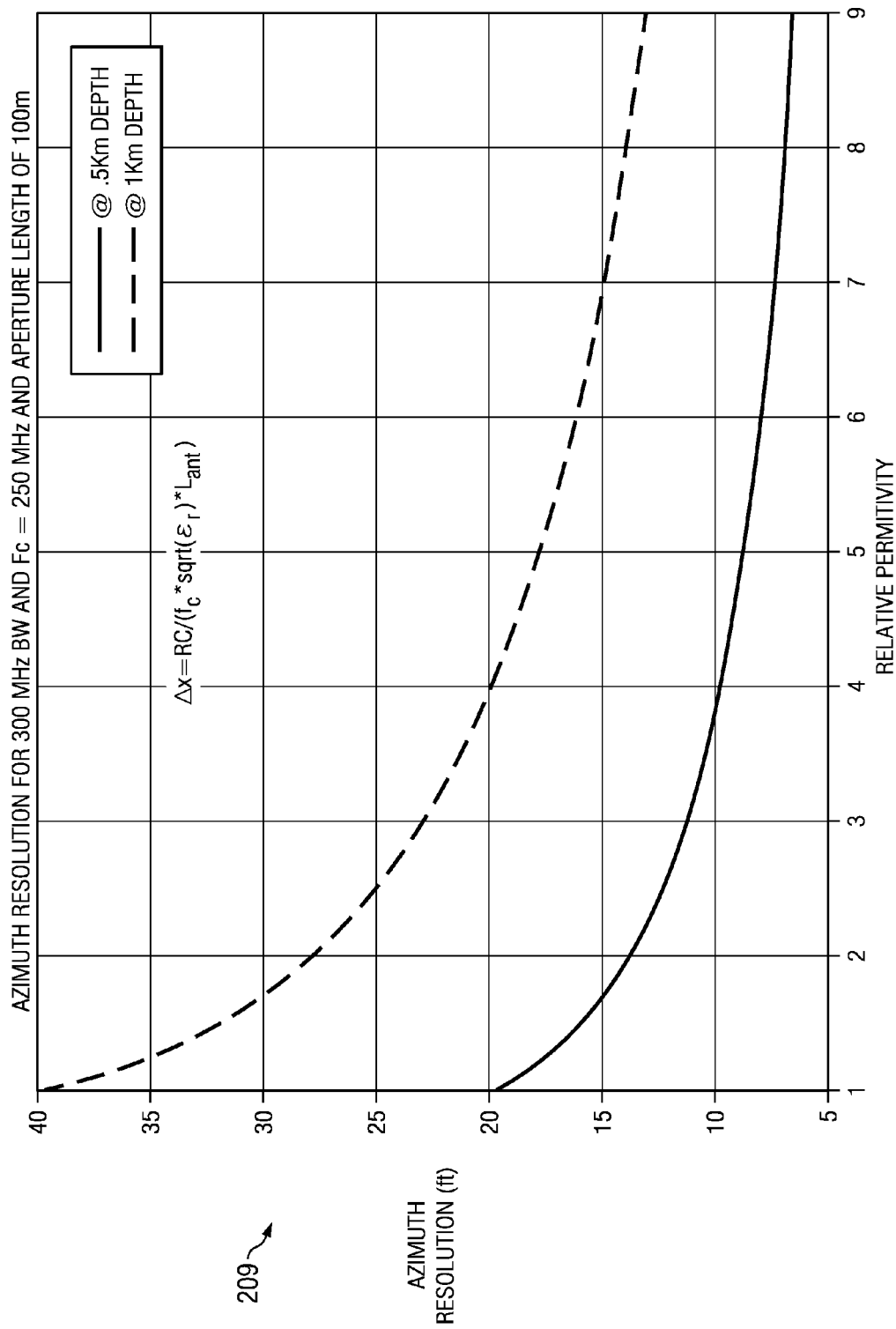

In FIG. 13, graph 208 shows the azimuth resolution achievable with a 300 MHz receiver bandwidth, a center frequency ($f_c$) of 250 MHz, and an aperture length of 100 m. The resolution is shown for four different depths, 500 m, 1 km, 5 km, and 10 km. The depicted analysis is for a single antenna. Using interferometric array methodologies, the resolution can be further enhanced. Superresolution processing techniques such as the Burg algorithm can be employed to achieve approximately a 300% improvement in resolution. In FIG. 14, graph 209 shows the same 500 m and 1 km depth curves as in FIG. 13, but with a more detailed scale for the azimuth resolution.

The foregoing outlines features of selected embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduce herein. Those skilled in the art should also realize that such equivalent constructions do not depart from the spirit and scope of the present disclosure, and that they may make various changes, substitutions, and alterations herein without departing from the spirit and scope of the present disclosure, as defined by the claims that follow.

What is claimed is:

1. A system, comprising:
    a radar system comprising:
        a radar transmitter configured to transmit a radar signal having a predetermined frequency into a subterranean region, wherein the radar transmitter is configured to contact ground for directing at least ninety percent of generated energy of the radar signal into the ground and penetrate at least ten kilometers into Earth's crust, wherein the predetermined frequency is a frequency selected from about ten kilohertz to about three-hundred megahertz and the predetermined frequency is varied over a dwell time of the radar system to meet phase drift tolerances;
        a radar receiver configured to receive a portion of the transmitted radar signal reflected from the subterranean region;
    a control system for controlling the dwell time; and
    a processor adapted to generate an image of at least a portion of the subterranean region based at least in part on the reflected signal, and to adjust transmitting segments of the radar transmitter and receiving segments of the radar receiver to obtain different look angles and optimize the image generated,
    wherein the radar system includes a receive aperture greater than about one-hundred meters and the transmitting segments for transmitting respective signals at different frequencies for three-dimensional imaging of the subterranean region at a resolution of less than one foot, wherein transmit hopping across the transmitting segments is used to improve depth perception in the three-dimensional imaging and the three-dimensional imaging is weighted by phase and amplitude statistics formed across multiple images to suppress sidelobes and noise.

2. The system of claim 1 wherein the dwell time is greater than 1 hour.

3. The system of claim 1 wherein the dwell time is greater than 24 hours.

4. The system of claim 1 wherein the dwell time is greater than 7 days.

5. The system of claim 1 wherein the radar system is one of a plurality of radar systems in an antenna array and the antenna array is configured to receive a plurality of reflected signals from the subterranean region.

6. The system of claim 5 wherein the processor is adapted for interferometric processing of the plurality of reflected signals.

7. The system of claim 1 wherein the radar system includes a dipole antenna.

8. The system of claim 1 wherein the radar system includes a transmit antenna portion spatially separated from a receive antenna portion.

9. A method comprising:
    transmitting a radar signal at a predetermined frequency into a subterranean region via a radar transmitter of a radar system, wherein the radar transmitter is configured to contact ground for directing at least ninety percent of generated energy of the radar signal into the ground and penetrate at least ten kilometers into Earth's crust, wherein the predetermined frequency is a frequency selected from about ten kilohertz to about three-hundred megahertz and the predetermined frequency is varied over a dwell time of the radar system to meet phase drift tolerances;
    receiving, via a radar receiver of the radar system, a portion of the transmitted radar signal reflected from the subterranean region;
    controlling the dwell time; and
    generating an image of the subterranean region using the reflected signal, and to adjust transmitting segments of the radar transmitter and receiving segments of the radar receiver to obtain different look angles and optimize the image generated,
    wherein the radar system includes a receive aperture greater than about one-hundred meters and the transmitting segments for transmitting respective signals at different frequencies for three-dimensional imaging of the subterranean region at a resolution of less than one foot, wherein transmit hopping across the transmitting segments is used to improve depth perception in the three-dimensional imaging and the three-dimensional imaging is weighted by phase and amplitude statistics formed across multiple images to suppress sidelobes and noise.

10. The system of claim 9 wherein the dwell time is greater than 24 hours.

11. The method of claim 9 wherein the subterranean region is located between 1 meter and 50 kilometer below ground.

12. The method of claim 9 wherein the radar system comprises a first and a second radar transmitter.

13. The method of claim 12 further comprising receiving, via a second radar receiver, another reflected signal produced by the radar signal reflected from the subterranean formation.

14. The method of claim 13 further comprising performing interferometric processing of a plurality of reflected signals received via the radar system.

15. The method of claim 9 wherein the step of generating an image includes generating a Doppler image of subterranean fluid movement.

16. The method of claim 9 further comprising categorizing an aspect of the subterranean formation and assigning a property value to the subterranean formation based upon the aspect.

17. A system comprising:
a radar system comprising:
   a distributed radar array including a first radar transmitter configured to transmit a first radar signal having a predetermined frequency into a subterranean region, wherein the transmitter is configured to contact ground for directing at least ninety percent of generated energy of the radar signal into the ground and penetrate at least ten kilometers into Earth's crust, wherein the predetermined frequency is a frequency selected from about ten kilohertz to about three-hundred megahertz and the predetermined frequency is varied over a dwell time of the radar system to meet phase drift tolerances;
   a plurality of receivers configured to receive a portion of the transmitted first radar signal reflected from the subterranean region;
a control system for controlling the dwell time; and
a processor adapted to generate an image of at least a portion of the subterranean region based at least in part on the reflected signal, and to adjust transmitting segments of the distributed radar array and receiving segments of the plurality of receivers to obtain different look angles and optimize the image generated,
wherein the radar system includes a receive aperture greater than about one-hundred meters and the transmitting segments for transmitting respective signals at different frequencies for three-dimensional imaging of the subterranean region at a resolution of less than a foot, wherein transmit hopping across the transmitting segments is used to improve depth perception in the three-dimensional imaging and the three-dimensional imaging is weighted by phase and amplitude statistics formed across multiple images to suppress sidelobes and noise.

18. The system of claim 17 wherein the distributed radar array further includes a second radar transmitter configured to transmit a second radar signal at the predetermined frequency into the subterranean region and wherein the control system is adapted to halt the transmission of the first radar signal and initiate transmission of the second radar signal.

19. The system of claim 17 wherein the processor is adapted for interferometric processing of the reflected signal.

20. A distributed radar array system comprising:
   a plurality of radar units, each unit including a waveform generator;
   a transmitter, connected to the waveform generator, configured to generate RF signals within a bandwidth, wherein the transmitter is configured to contact ground for directing at least ninety percent of generated energy of the RF signals into the ground and penetrate at least ten kilometers into Earth's crust; and
   a receiver configured to receive a portion of the transmitted RF signals reflected from a subterranean region, wherein the distributed radar array comprises a receive aperture greater than about one-hundred meters and the transmitting segments for transmitting respective signals at different frequencies for three-dimensional imaging of the subterranean region at a resolution of less than one foot, wherein transmit hopping across the transmitting segments is used to improve depth perception in the three-dimensional imaging and the three-dimensional imaging is weighted by phase and amplitude statistics formed across multiple images to suppress sidelobes and noise.

21. The distributed radar array system of claim 20 further comprising:
   a control system configured to control the transmitter and receiver.

22. The distributed radar array system of claim 21 wherein the control system is configured to distribute a synchronized clock signal to at least a portion of the plurality of radar units.

23. The distributed radar array system of claim 21 wherein the control system is configured to distribute a local oscillator signal to at least a portion of the plurality of radar units.

24. The distributed radar array system of claim 21 further comprising a fiber optic connection to convey control instructions between the control system and the plurality of radar units.

25. The distributed radar array system of claim 24 wherein the fiber optic connection includes a time shared optic fiber.

26. The distributed radar array system of claim 21 wherein the control system is operable to select a first radar unit from the plurality of radar units to generate a first RF signal within the bandwidth at a first transmit time and is operable to select a second radar unit from the plurality of radar units to generate a second RF signal within the bandwidth at a second transmit time.

27. The distributed radar array system of claim 20 further comprising a processor configured to process the reflected signals, and to adjust transmitting segments of the transmitter and receiving segments of the receiver to obtain different look angles and optimize the image generated.

28. The distributed radar array system of claim 27 wherein the processor is configured to process the reflected signals using an interferometric processing technique.

29. The distributed radar array system of claim 27 wherein the processor is configured to process the reflected signals using a tomographic three dimensional processing technique.

* * * * *